United States Patent [19]
Higashida

[11] Patent Number: 5,378,257
[45] Date of Patent: Jan. 3, 1995

[54] FERTILIZER PRODUCTION

[76] Inventor: Shouji Higashida, 979 Fussa, Fussa-Shi, Tokyo, Japan

[21] Appl. No.: 47,404

[22] Filed: Apr. 19, 1993

[51] Int. Cl.⁶ .................... C05F 7/00; C05F 9/02
[52] U.S. Cl. ........................... 71/12; 71/14;
    422/189; 422/292; 422/307; 210/205; 210/770
[58] Field of Search .............. 71/11, 12, 13, 14, 15;
    210/758, 724, 205, 199, 770; 422/189, 292, 293,
    307, 309

[56] References Cited
U.S. PATENT DOCUMENTS

| | | | |
|---|---|---|---|
| 3,942,970 | 3/1976 | O'Donnell | 71/28 |
| 4,038,180 | 7/1977 | Talbert | 71/12 |
| 4,078,094 | 3/1978 | Katzen | 71/12 |
| 4,226,712 | 10/1980 | Kamei | 71/12 |
| 4,306,978 | 12/1981 | Wurtz | 71/12 |
| 4,743,287 | 5/1988 | Robinson | 71/12 |

FOREIGN PATENT DOCUMENTS

| | | | |
|---|---|---|---|
| 0356781 | 3/1990 | European Pat. Off. | 71/12 |
| 2738957 | 3/1978 | Germany | 71/12 |
| 52-658 | 1/1977 | Japan | 71/12 |
| 57-78997 | 5/1982 | Japan | 71/12 |
| WO9116280 | 10/1991 | WIPO | 71/12 |

Primary Examiner—Neil McCarthy
Attorney, Agent, or Firm—Wenderoth, Lind & Ponack

[57] ABSTRACT

A process for organic fertilizer production of the invention comprises stirring a batch of the waste matter to be treated with an amount of nitric acid to mix the waste matter with nitric acid, crushing the waste water mixed with nitric acid to make sludge, adding an amount of quicklime to the sludged waste matter mixed with nitric acid and then stirring the waste matter, thereby neutralizing the waste matter with slaked lime formed by the reaction with water, and drying the neutralized waste matter. An apparatus for the production of organic fertilizer is also disclosed.

4 Claims, 3 Drawing Sheets

FERTILIZER PRODUCTION

BACKGROUND OF THE INVENTION

1. Field of the Invention

The present invention relates generally to organic fertilizer production and, more particularly, to a process and equipment for producing unpolluting organic fertilizer from waste matter such as garbage and sewage.

According to the present invention, the waste matter can be easily treated at low cost and without causing environmental pollution, thereby providing unpolluting organic fertilizer.

The thus produced organic fertilizer can be stored over extended periods of time and, being buried in the ground, is decomposed and so taken in by in plants.

2. Description of Related Art

In the past, garbage as from a market or kitchen has been incinerated at elevated temperatures of about 750° to 950° C. in a certain garbage disposal system and, simultaneously with this, bad-smelling air has been burned. Toxic gases generated by incineration are removed by an attachment, and so are not discharged from the garbage disposal system. The resulting ash is carried to a given place for reclamation.

FIG. 3 illustrates a typical example of conventional waste matter disposal equipment. As illustrated, a batch of the waste matter is fed in a tank 100, in which it is crushed by a crusher 102, and it is carried therefrom into a storage tank 104. In this tank 104, the waste matter is treated by a centrifuge 106, and is then fed to a regulator tank 108. The thus centrifuged waste matter is incinerated in an incinerator system 110.

The liquid waste matter in the tank 108 is mixed with air in a spray oxidization tank 112 and a catalytic oxidizer 114, fed into an aerobic oxidization tank 116 in which it is converted into a form that is easily digestible by bacteria, and then fed into an aerator 118 in which it is oxidized (or corroded) by oxygen and bacteria.

The thus oxidized liquid waste water is fed into a sedimentation tank 120 for finer matter removal, sterilized by a chlorine sterilizer 122, and finally diluted with much water for draining into rivers, etc.

Year by year, there is a remarkable increase in the amount of garbage thrown away, and this has already become a social problem in large cities and their surroundings.

However, much difficulty has been experienced in building new incineration installations, thanks to skyrocketing land rents, trouble in locating building sites, and environmental problems. Even when building sites are located, there is a new problem as to where the incinerated waste matter will be stored.

Moreover, since conventional sewage disposal installations are very large, it is very difficult to build up them at new locations, because of skyrocketing land rents and difficulty in securing building sites. To add to this, since conventional disposal installations need much water for sewage treatment, some severe limitation is now imposed on the conditions of location; for instance, such installations must be located near rivers. Even when such location is secured, it is difficult to construct such installations.

It is generally said that rivers have a self-cleaning action when suspended solids are within 5 ppm. However, since the current standard for effluent from sewage disposal systems is within 40 ppm in terms of suspended solids (in Tokyo Metropolis), rivers, gulfs and seawater are much more polluted, if effluents having such large suspended solids are discharged.

In view of the situations as mentioned above, an object of the invention is to provide a system and process for producing organic fertilizer which can treat waste matter such as garbage and sewage on a smaller scale and at lower cost than ever before, and without causing environmental pollution, thereby producing unpolluting organic fertilizer that can be used as a land improver as well.

SUMMARY OF THE INVENTION

According to one aspect of the invention, there is provided a system for organic fertilizer production, comprising:

a first treatment tank for stirring a batch of the waste matter to be treated with a given amount of nitric acid by means of a stirrer, a second treatment tank for crushing the waste matter which was mixed with nitric acid in the first treatment tank by means of a crusher to make sludge, a third treatment tank for adding a given amount of quicklime to the waste matter which was mixed with nitric acid and crushed in the second treatment tank to neutralize the waste matter while it is stirred by a stirrer, and a drying unit for drying the waste matter which was neutralized in the third treatment tank.

According to another aspect of the invention, there is provided a process for producing organic fertilizer by:

stirring a batch of the waste matter to be treated with a given amount of nitric acid to mix the waste matter with nitric acid, crushing the waste matter mixed with nitric acid to make sludge, adding a given amount of quicklime to the sludged waste matter mixed with nitric acid and then stirring the waste matter, thereby neutralizing the waste matter with slaked lime formed by the reaction with water, and drying the neutralized waste matter.

According to a further aspect of the invention, there is provided a system for producing organic fertilizer, comprising:

a first treatment tank for stirring a solid form of the waste matter to be treated with a given amount of nitric acid by means of a stirrer, a second treatment tank for stirring a liquid form of the waste matter to be treated with a given amount of nitric acid by means of a stirrer, a third treatment tank for crushing the waste matter which was mixed with nitric acid in the first treatment tank by means of a crusher to make sludge, a alternatively, third treatment tank for stirring the solid waste matter which was mixed with nitric acid in the first treatment tank with the liquid waste matter treated in the second treatment tank by means of a crusher, thereby making sludge, a fourth treatment tank for stirring a given amount of quicklime into the waste matter which was mixed with nitric acid and sludged in the third treatment tank by means of a crusher, thereby neutralizing the waste matter, and a drying unit for drying the waste matter neutralized in the fourth treatment tank.

BRIEF DESCRIPTION OF THE INVENTION

The features of the invention which are believed to be novel are particularly pointed out and distinctly claimed in the concluding portion of this specification. However, the invention may be best appreciated by reference to the following detailed description taken in conjunction with the drawings, in which:

Referring first to FIG. 1, the principles of the invention are illustrated. In a treatment tank 16, a batch of the waste matter 10 to be treated, like garbage, is stirred with a given amount of nitric acid 12, as shown in FIG. 1(A).

Figure 1A:
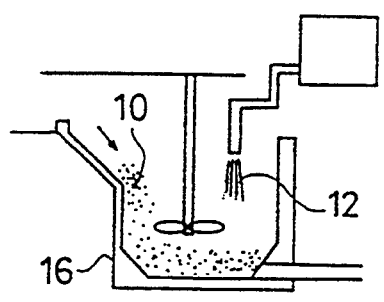
FIGS. 1A-1D are an illustration of the invention.
Figure 1B:
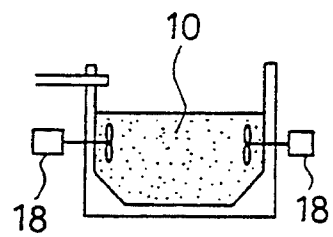
Figure 1C:
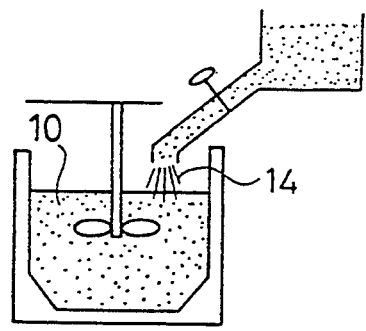

The waste matter 10 mixed with nitric acid is sludged by means of a crusher 18, as can be seen from FIG. 1(B). If required, some water may be added to it.

The waste matter 10 mixed with nitric acid and sludged by the crusher 18 is then stirred with a given amount of quicklime 14, whereby the waste matter 10 is neutralized with slaked lime formed by the reaction with water.

Figure 1D:
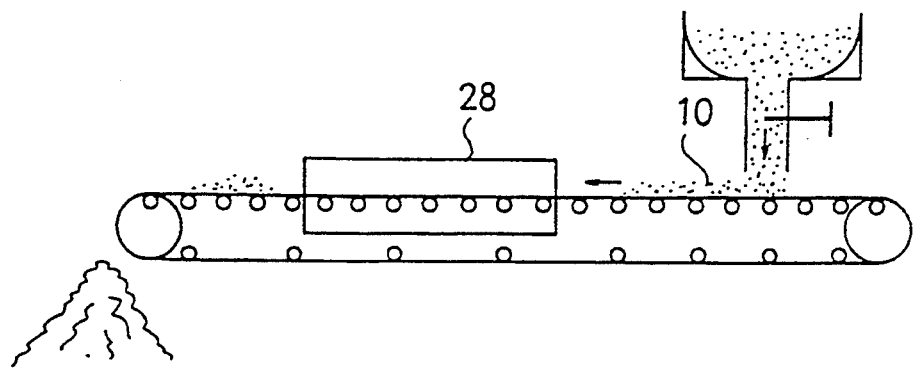

The thus neutralized waste matter 10 is dried by a drying unit 28, as shown in FIG. 1(D), thereby making it easy to handle.

According to the invention, the waste matter 10 is oxidized with nitric acid 12 incorporated in it. It is thus possible to achieve the oxidation of the waste matter 10 with the use of a smaller system and within a shorter period time than would be possible with a conventional system designed to oxidize the waste matter gradually with oxygen and bacteria. When the waste matter is crushed with the addition of water, it is unlikely to give out some offensive smell.

According to the invention, the waste matter 10 mixed with nitric acid is neutralized with the addition of quicklime 14, followed by drying. In other words, the thus produced organic fertilizer can be stored over extended periods of time and, upon being buried in the ground, is decomposed and so taken in by plants.

Figure 2:
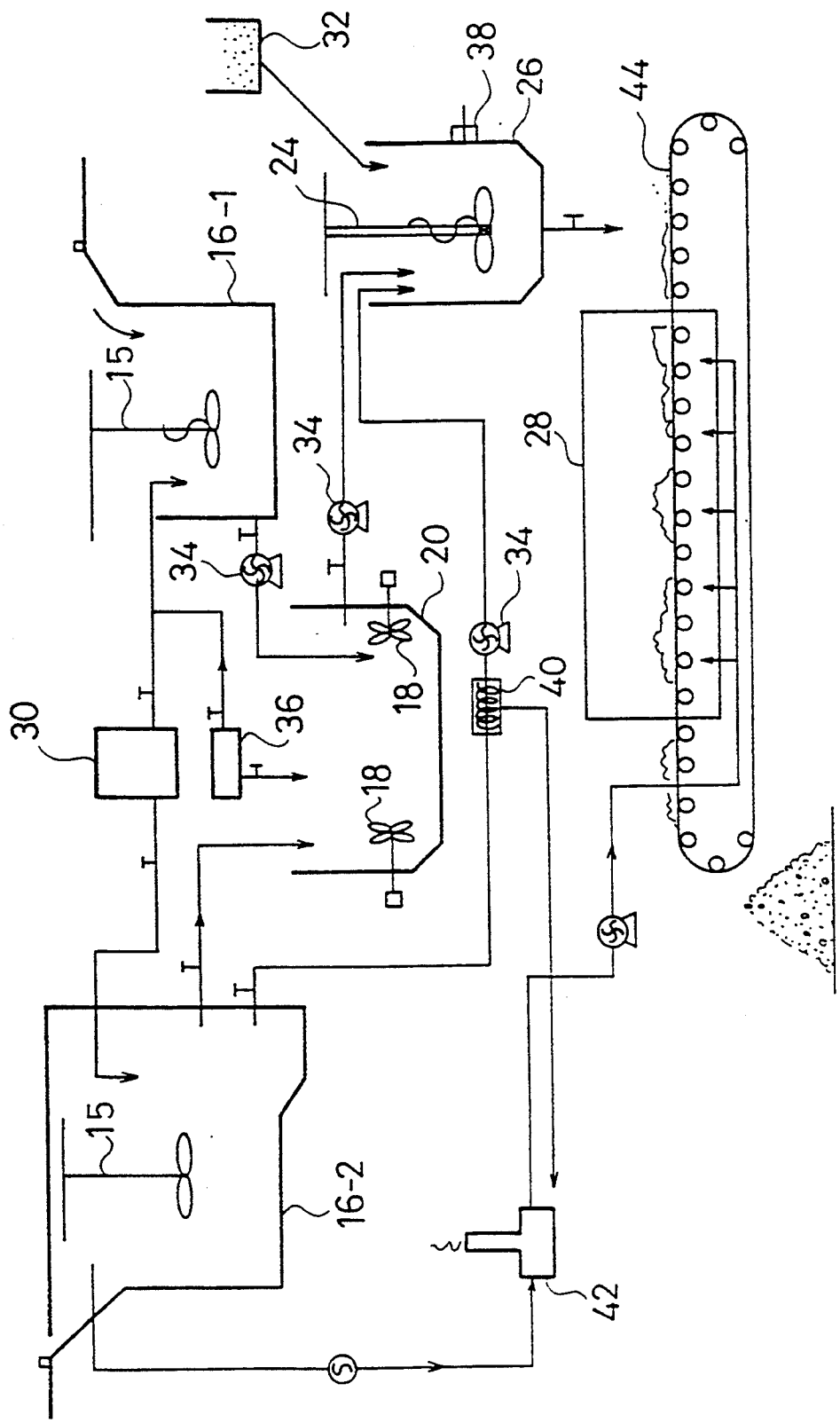
FIG. 2 is an illustration of the general construction of one embodiment according to the invention.
Figure 3:
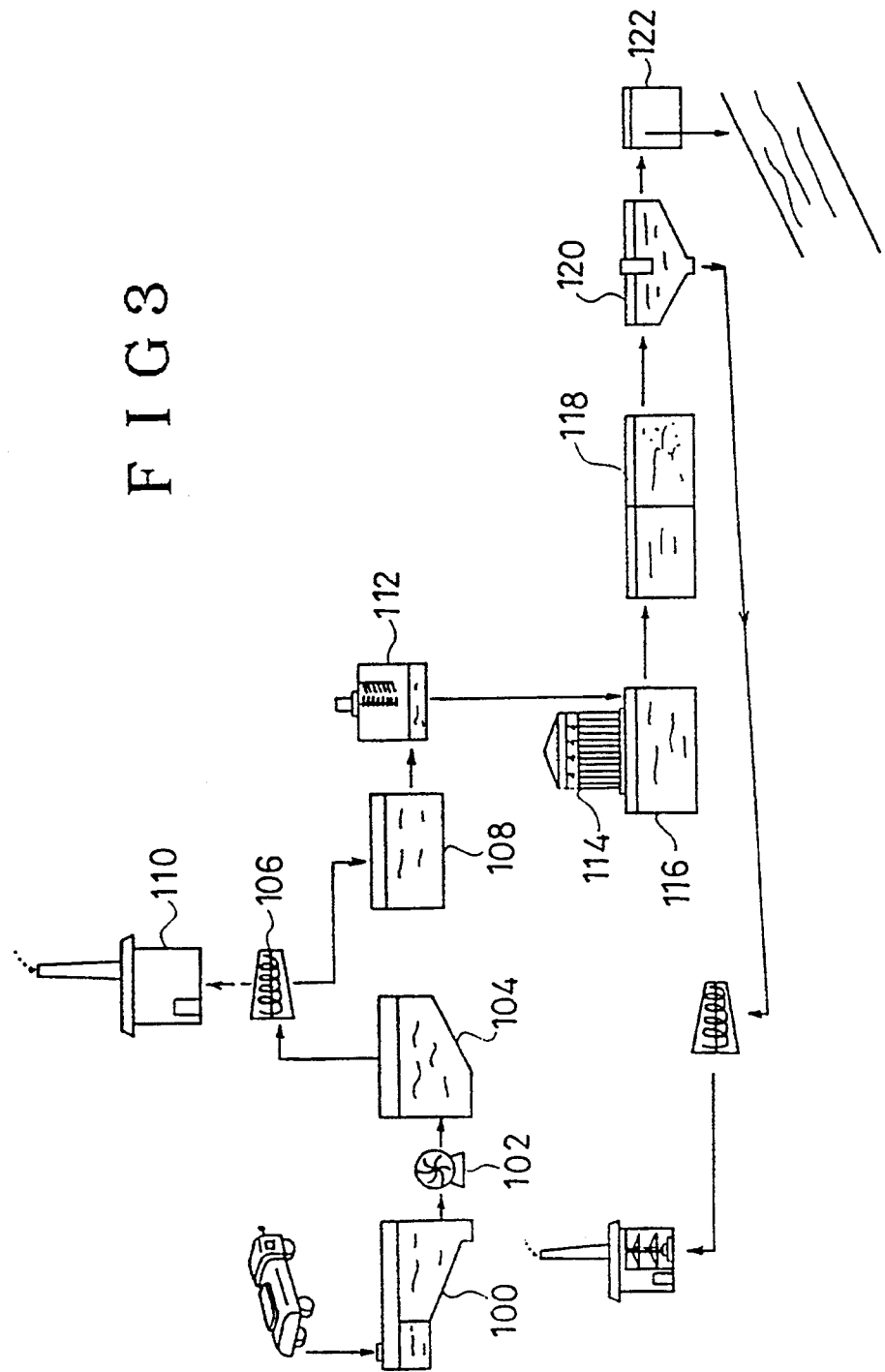
FIG. 3 is an illustration of one typical example of the prior art.

Referring to FIG. 2, there is represented a preferable embodiment of the invention. Classified garbage is fed to a first treatment tank 16-1. A given amount of nitric acid is added from a nitric acid reservoir 30 to the garbage, which is then stirred by means of a stirrer 15.

The waste matter, like sewage, is fed to a second treatment tank 16-2, to which a given amount of nitric acid is added. Then, this waste matter is stirred by means of stirrer 15.

The garbage mixed with nitric acid in the tank 16-1 is carried into a third treatment tank 20 under the action of a vacuum pump 34, and is provided with a constant amount of water from a water reservoir 36, followed by sludging by a crusher 18. In this case, the sludged water in the tank 16-2 may be used in addition to the water stored in water tank 36.

The waste matter mixed with nitric acid in the tank 16-2 is carried into the fourth treatment tank 20 as well, and is sludged by crusher 18 with the addition of water, if required.

The garbage (and sewage) is then carried into a fourth treatment tank 26 under the action of vacuum pump 34, in which a given amount of quicklime is added thereto from a quicklime reservoir 32. Thereafter, the garbage is stirred by a stirrer 24 for neutralization. Here, the pH of the waste matter (garbage and sewage) in the fourth tank 26 is precisely measured by a pH meter 38 so as to check whether or not the waste matter is completely neutralized.

When the sewage in the second tank 16-2 is a sludge form, it may be centrifuged at 40 for undesired matter removal, and then carried into the fourth tank 26 not by way of the third tank 20. The undesired matter removed by centrifuge 40 is incinerated in an incinerator 42. Here, the bad-smelling air in the tank 16-2 is simultaneously burned.

The waste matter neutralized in the fourth tank 26 is then carried by way of a carrier 44 including a dryer chamber 28 somewhere, in which the waste matter is dried for bagging, etc.

In order to make efficient use of energy, hot air is fed into drying chamber 28 from incinerator 42.

While the above embodiment has been described with reference to the separate treatment of garbage and sewage, it is also possible to treat them concurrently (or mix them together in the second tank 20).

According to the embodiment of the invention, garbage and sewage are oxidized with nitric acid incorporated in them. In other words, it is possible to achieve the oxidation of garbage with a smaller system and within a shorter period of time than would be possible with a conventional system designed to oxide (or corrode) garbage slowly with the use of oxygen and bacteria. Moreover, when water is added for crushing, it is most unlikely to give out some offensive smell.

Upon quicklime added to garbage, etc., mixed with nitric acid, the quicklime first reacts with water contained therein to form slaked lime, as expressed by

$$CaO + H_2O \rightarrow Ca(OH)_2$$

For instance, the reaction of 56 g of quicklime with 18 g of water yields 74 g of slaked lime.

The slaked lime then reacts with the nitric acid mixed with garbage, etc., for neutralization, as expressed by

$$Ca(OH)_2 + 2HNO_3 \rightarrow Ca(NO_3)_2 + H_2O$$

For example, the reaction of 74 g of slaked lime with 126 g of nitric acid yields 160 g of calcium nitrate and 18 g of water. Accordingly, the amount of quicklime required for the neutralization of the nitric acid fed in can be easily found from the amount of the nitric acid fed in.

It is noted that since the thus obtained organic matter is oxidized (or corroded) by atmospheric oxygen or bacteria, it is required that some excessive alkali be added to the organic matter so as to ward off its oxidization. It is also noted that the term "organic matter" means a mixture of compounds of oxygen (O), hydrogen (H) and carbon (C) with nitrogen (N), phosphorous (P), potassium (K), and so on.

According to the invention, garbage and sewage mixed with nitric acid and crushed are neutralized with quicklime, followed by drying. Thus, not only is the resulting organic fertilizer easy to handle, but it can be stored over an extended period of time as well. Upon being buried in the ground, the fertilizer is decomposed and oxidized (or corroded) slowly by atmospheric oxygen, or oxygen or bacteria contained in the ground, and thereby taken in by plants.

While the above embodiment of the invention has been explained with reference to the use of four tanks, i.e., tanks 16-1 and 16-2, the third tank 20 and the fourth tank 26, it is understood that the invention may principally be carried out with the use of a single tank.

According to the invention explained above, garbage and sewage are oxidized with nitric acid incorporated in them. In other words, it is possible to achieve the oxidation of them with a smaller system making use a smaller amount of water and within a shorter period of time than would be possible with a conventional system designed to oxidize (or corrode) them slowly with oxygen and bacteria. For this reason, garbage and sewage treatments can be carried out at lower costs and without causing environmental pollution, or it is possible to provide unpolluting organic fertilizer. Moreover, when water is added to them for crushing, it is most unlikely to give off an offensive smell.

According to the invention, garbage and sewage are mixed with nitric acid, crushed, and neutralized with quicklime, followed by drying. Accordingly, not only is the resulting fertilizer easy to handle, but it can be stored over an extended period of time.

What is claimed is:

1. A system for organic fertilizer production, consisting essentially:
    a source of waste matter selected from at least one of classified garbage and sewage,
    a source of nitric acid,
    a source of quicklime,
    a first treatment tank for stirring a batch of waste matter selected from at least one of classified garbage and sewage with nitric acid by means of a stirrer,
    a second treatment tank for crushing the waste matter mixed with nitric acid in the first treatment tank by means of a crusher to make sludge,
    a third treatment tank for adding quicklime to the waste matter mixed with nitric acid and crushed in the second treatment tank to neutralize the waste matter while it is stirred by a stirrer, and
    a drying unit for drying the waste matter neutralized in the third treatment tank.

2. A process for organic fertilizer production consisting essentially of the steps of:
    stirring a batch of waste matter selected from at least one of classified garbage and sewage with nitric acid in a first treatment tank to mix the waste matter with nitric acid,
    crushing the waste water mixed with nitric acid in a second treatment tank to make sludge,
    adding quicklime to the sludge waste matter mixed with nitric acid in a third treatment tank and then stirring the waste matter to neutralize the sludge waste matter, and
    drying the neutralized waste matter.

3. A system for organic fertilizer production, consisting essentially of:
    a source of waste matter selected from at least one of classified garbage and sewage,
    a source of nitric acid,
    a source of quicklime,
    a first treatment tank for stirring a solid form of waste matter consisting essentially of classified garbage with nitric acid by means of a stirrer,
    a second treatment tank for stirring a liquid form of waste matter consisting essentially of sewage with nitric acid by means of a stirrer,
    a third treatment tank for crushing the waste matter mixed with nitric acid in the first treatment tank by means of a crusher to make sludge,
    a fourth treatment tank for adding quicklime to the waste matter mixed with nitric acid and sludge in the third treatment tank by means of a crusher, thereby neutralizing the waste matter, and
    a drying unit for drying the waste matter neutralized in the fourth treatment tank,
    wherein the waste matter treated in the second treatment tank is crushed with the waste matter in the third treatment tank before being neutralized in the fourth treatment tank or, alternatively, wherein the waste matter treated in the second treatment tank is directly neutralized in the fourth treatment tank without being crushed in the third treatment tank.

4. A process for organic fertilizer production consisting essentially of the steps of:
    stirring a batch of solid waste matter consisting essentially of classified garbage with nitric acid in a first treatment tank to mix the waste matter with nitric acid,
    stirring a batch of liquid waste matter consisting essentially of sewage with nitric acid in a second treatment tank to mix the waste matter with nitric acid,
    crushing the waste water mixed with nitric acid obtained from the first treatment tank in a third treatment to make sludge,
    adding quicklime to the sludge waste matter mixed with nitric acid obtained from the third treatment tank in a fourth treatment tank and then stirring the waste matter to neutralize the sludge waste matter, and
    drying the neutralized waste matter,
    wherein the waste matter treated in the second treatment tank is crushed with the waste matter in the third treatment tank before being neutralized in the fourth treatment tank or, alternatively, wherein the waste matter treated in the second treatment tank is directly neutralized in the fourth treatment tank without being crushed in the third treatment tank.

* * * * *